United States Patent [19]

Awano et al.

[11] Patent Number: 4,529,644

[45] Date of Patent: Jul. 16, 1985

[54] HEAT RESISTANT PAD FOR USE WITH REAR FACILITIES OF ALUMINIUM EXTRUSION PRESSING MACHINE

[75] Inventors: Shunya Awano, Matsudo; Kazusuke Koseki, Kashiwa; Masanori Nishida, Narashino, all of Japan

[73] Assignee: Ichikawa Woolen Textile Co., Japan

[21] Appl. No.: 441,110

[22] Filed: Nov. 12, 1982

[30] Foreign Application Priority Data

Nov. 18, 1981 [JP] Japan .......................... 56-170711[U]

[51] Int. Cl.[3] .......................... B32B 5/28; B32B 5/14

[52] U.S. Cl. .................................... 428/284; 428/300; 428/234; 428/235; 428/287; 428/288; 428/301; 428/902; 428/282

[58] Field of Search ............... 428/902, 300, 301, 408, 428/284, 287

[56] References Cited

U.S. PATENT DOCUMENTS

| | | | |
|---|---|---|---|
| 3,265,557 | 8/1966 | De Fries et al. . | |
| 3,556,922 | 1/1971 | Green et al. | 428/902 X |
| 3,936,555 | 2/1976 | Smith | 428/301 X |
| 4,284,680 | 8/1981 | Awano et al. | 428/300 X |

FOREIGN PATENT DOCUMENTS

| | | |
|---|---|---|
| 216889 | 7/1973 | France . |
| 39571 | 4/1975 | Japan . |
| 1404271 | 8/1975 | United Kingdom . |

*Primary Examiner*—George F. Lesmes
*Assistant Examiner*—Nancy A. B. Swisher
*Attorney, Agent, or Firm*—Pahl, Lorusso & Loud

[57] ABSTRACT

Disclosed herein is a heat resistant pad which comprises a plurality layers of batt mixtures essentially consisting of carbon fibers and aromatic polyamide fibers, the layers of batt mixtures being superposed and entangled to integrate into a felt-like structure by way of needle punching.

A heat resistant pad of such constitution has a property of adequate flexibility, wear resistance, impact resistance, frictional coefficient and cushioning property for use with rear facibilities of an aluminium extrusion pressing machine.

Also disclosed is a heat resistant pad coated and impregnated with a silicone resin to improve wear resistance and impact resistance.

8 Claims, 15 Drawing Figures

HEAT RESISTANT PAD FOR USE WITH REAR FACILITIES OF ALUMINIUM EXTRUSION PRESSING MACHINE

BACKGROUND OF THE INVENTION (i) Field of the Invention

Thin invention concerns a heat resistant pad for use with a cooling table or a spacer in the extrusion forming process in the fields of non-ferrous metal industries such as for aluminium or in heat treatment processes in ceramic industries or the like.

More specifically, it relates to a felt-structured heat resistant pad for use with rear facilities of an aluminium extrusion pressing machine, such as a canister, initial table, run-out table, lift arm and cooling table.

(ii) Description of the Prior Art

Rear facilities of an aluminium extrusion pressing machine are used for receiving or transporting the extruded products at high temperature (550°–600° C.) shaped through an extrusion die. It is required that the heat resistant pad for use with such facilities satisfy the following criteria (1) capability of withstanding high temperatures of about 600° C., (2) not scratching the surface of the extruded products, (3) adequate cushioning property, with no grooved traces left by the extruded products, (4) adequate friction coefficient so as not to allow excess slip of the extruded products, (5) low heat conductivity, (6) low hygroscopic property, (7) no generation of decomposed gases nor deposition by melting upon contact with the extruded product and (8) sufficient wear resistance and impact resistance under high temperature conditions.

However, since conventional heat resistant pads are made of plates of materials such as synthetic or natural carbon, woven fabrics of asbestos or glass fibers and plates of teflon resin, they suffer from the following disadvantages:

(a) Heat Resistant Pads Made of Plates of Synthetic or Natural Carbon

Since they lack in wear resistance and tend to have grooved traces at the surface thereof formed by the extruded products, the succeeding extruded products are often caught in the traces and damaged. Further, since they have high heat conductivity, the portions of the extruded products undergoing cooling will be at different temperatures depending on whether or not they are in contact with the surfaces of the pad, which temperature differences result in an altering of the crystal structure of aluminium. Consequently, cooling produces remarkable dimensional errors, formation of pits in the rapidly cooled portions of the extruded products depending on their cross sectional profile, or results in clouding and so-called black spots or white spots in the subsequent surface treatment or like additional steps. Furthermore, since they have an excessively low frictional coefficient, the extruded products can not be transported due to excess slip when such material are used in a lift arm or a cooling table.

(b) Heat Resistant Pads Made of Woven Fabrics of Asbestos or Glass Fibers

While they are usually woven into cloth and affixed to a metallic core in use, they lack in flexibility and tend to damage the extruded products. Further, they are susceptible to injury from impact applied from the edges of the extruded products, and the pad body inevitably undergoes attrition to form powdery dusts which worsen the working atmosphere.

(c) Heat Resistant Pads Made of Teflon Resin

Just like in (a) above, poor wear resistance often leads to injury by the extruded products and insufficient frictional coefficient causes trouble in the transportation of the extruded products. Furthermore, the resin may possibly melt and to deposit on the extruded products.

SUMMARY OF THE INVENTION

The object of this invention is to overcome the foregoing problems and provide a heat resistant pad having flexibility, cushioning, wear resistance and impact resistance coupled with an adequate frictional coefficient. The pad of the present invention, intended for use with rear facilities of an aluminium extrusion pressing machine, if formed of a plurality of batts essentially consisting of carbon fibers which have excellent heat-resistance and flexibility and which cause no damage to extruded products admixed with aromatic polyamide fibers which have excellent heat resistance and low heat conductivity and which serve to reduce the heat conductivity of the batts to as low as possible, the batts being superposed into a plurality of layers and entangled together into an integral felt-like structure by needle punching.

A further object of the invention is to provide a heat resistant pad having flexibility, cushioning property, wear resistance and impact resistance coupled with an adequate frictional coefficient, and for use with rear facilities of an aluminium extrusion pressing machine, formed of a plurality of batts essentially consisting of carbon fibers which have excellent heat-resistance, flexibility and which causes no damage to extruded products admixed with aromatic polyamide fibers having excellent heat resistance and low heat conductivity to reduce the overall heat conductivity of the batts to as low as possible, the batts being superposed into a plurality of layers and entangled together into an integral felt-like structure by needle punching, and in which at least one surface layer of the pad body is coated and impregnated with a silicone resin heat resistant paint to improve wear resistance and impact resistance while maintaining the initial form of the pad body to elongate the service life of the pad.

DETAILED DESCRIPTION OF THE INVENTION AND PREFERRED EMBODIMENTS

This invention is to be described by way of preferred embodiments shown in FIG. 1 to FIG. 6D.

Figure 1:
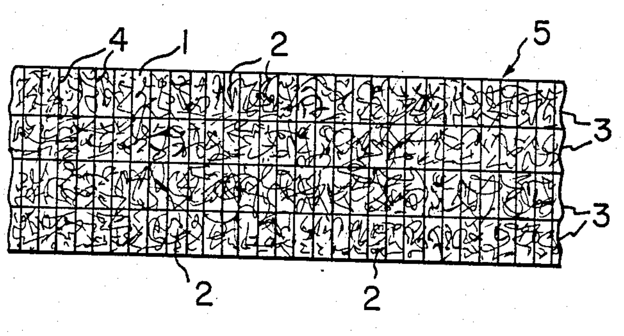
FIG. 1 shows one embodiment of this invention in cross sectional view in which needle punching is illustrated diagrammatically.

FIG. 1 shows a pad body 5 mixed fiber batts 3, each batt essentially consisting of carbon fibers 1 admixed with aromatic polyamide fibers 2, batts 3 being superimposed into a plurality of layers and entangled together into an integral felt-like structure by way of needle punching 4.

For the convenience of the illustration, the carbon fibers 1 are represented by the blank areas, the aromatic polyamide fibers 2 by zigzag solid lines and the needle punching 4 by parallel vertical lines.

The purposes of admixing the carbon fibers 1 with the aromatic polyamide fibers 2 are to compensate the defective abrasion resistance and heat conductivity and easily damaged nature of the carbon fibers, as well as to enhance the entanglement of the fibers in the course of the needle punching. Accordingly, it is preferred to set the mixing ratio of the carbon fibers 1 to the aromatic polyamide fiber 2 within a range of 8–6:2–4 and, particularly, within a range of 7:3. If the relative content of aromatic polyamide fibers is below the specified range, the foregoing purposes can not be satisfied. While on the other hand, if the relative content of the polyamide fibers exceeds the specified range, the heat resistance of the pad body 5 per se is reduced, because the upper limit of the heat resistivity for the aromatic polyamide fibers is from 200° to 300° C., which is significantly lower than the heat resistant temperature required for the pad body 5.

The aromatic polyamide fibers referred to above include "methaphenylene isophthalamide" commercially available under the tradename of "CONEX" and "NOMEX" or "methaphenylene terephthalamide" commercially available under the tradename of "KEVLAR".

In the mixed fiber batts 3 subjected to the needle punching 4, since the carbon fibers 1 and the aromatic polyamide fibers 2 are entangled with each other in random directions in each of the layers as well as between the layers, and the fibers are oriented in the direction of the punching, the strength of the pad against the frictional force of the aluminium extruded products (not shown) is further increased.

It is also desired that the pad body 5 have a density from 0.25 to 0.6 g/cm$^3$ after the needle punching. In other words, when the thickness of the pad body is between 7 to 12 mm, it is desirous that the weight of the pad body be between 3000 to 4000 g/m$^2$. If the density exceeds the specified range, the pad lacks in flexibility and tends to damage the extruded products; moreover, the heat conductivity of the pad is increased. While on the other hand, if the density is lower than the specified range, the toughness is lost, whereby the pad is liable to be injured by the extruded products and the wear resistivity is reduced.

Figure 2:
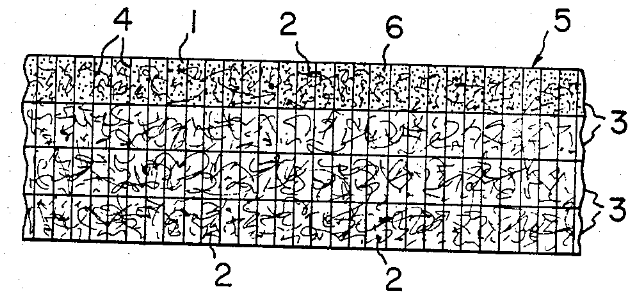
FIG. 2 shows another embodiment of this invention in cross section wherein a heat resistant paint 6 is coated on and impregnated into the surface layer of the pad.

FIG. 2 shows one example of a pad body 5 comprising mixed fiber batts 3 essentially consisting of carbon fibers 1 admixed with aromatic polyamide fibers 2, which are superimposed into a plurality of layers and entangled together into an integral felt-like structure by way of needle punching 4 to form a pad body 5, and in which at least the upper surface layer of the body is coated and impregnated with a silicone resin heat resistant paint 6 (represented the fine dots).

The silicone resin heat resistant paint 6 to be applied for the coating and impregnation of pad body 5 may be silicone resin alone or a mixture consisting essentially of silicone resin and heat resistant reinforcing material such as carbon, graphite or metal oxide admixed therewith, which is despersed and mixed in a solvent such as xylene. The coating film formed from such a paint has excellent heat resistance at temperatures as high as 600°–800° C., and the coating on the constituent fibers of the heat resistant pad with the paint film can advantageously increase the wear and impact resistance of the heat resistant pad while maintaining the heat resistance of the carbon fibers.

The paint may be coated and impregnated by way of any conventional means such as spraying, impregnation, brush coating or roller coating and the pad may be coated only on the surface in contact with the extruded products, over the side surface also or over its entire surface and, depending on the case, may be impregnated through the entire pad. In any case, it is important to control the coating amount so as not to impair the flexibility and the cushioning property of the pad. Preferable amounts of silicone resin are such that the solid matter remained after volatilization is 3–15 wt% of the weight of the pad body to be coated. Curing after drying for the paint is, preferably, carried out at 180°–200° C. for about 30–40 min.

The heat resistant pad according to the invention can be fabricated, for use, into various configurations such as plate, conveyor belt, tube and roll, depending on the application and intended use in a canister, initial table, run-out table, lift arm, cooling table or the like of an aluminium extrusion pressing machine.

Figure 3:
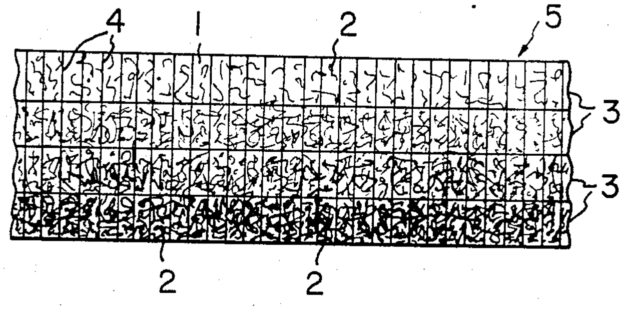
FIG. 3 is a cross sectional view of a pad mixture in which the mixing ratio for the two types of fibers varies from batt to batt
Figure 4A:
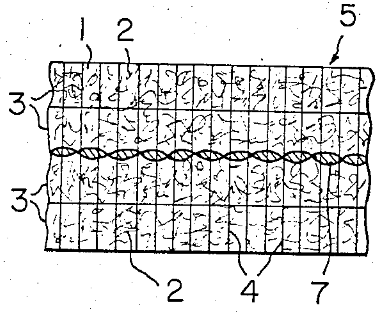
FIGS. 4A, 4B, 4C and 4D show various embodiments in cross section wherein a foundation fabric is interposed between batts or attached.
Figure 4B:
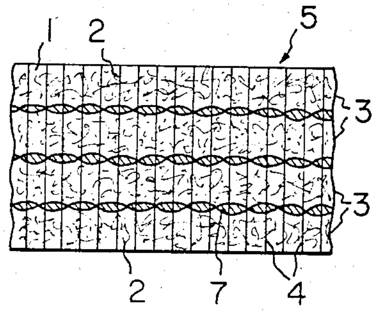
Figure 4C:
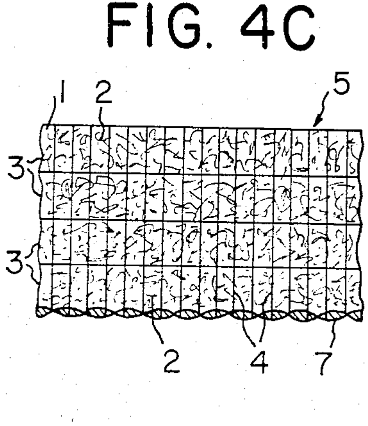
Figure 4D:
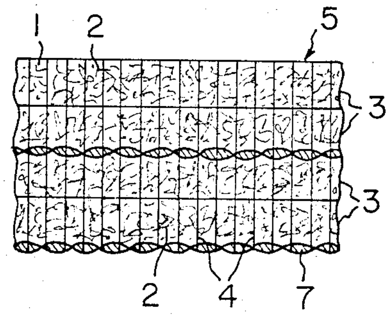
Figure 5A:
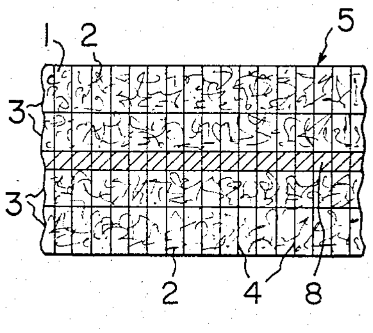
FIGS. 5A, 5B, 5C and 5D show various embodiments in cross section wherein a batt solely consisting of aromatic polyamide fibers is interposed between mixed fiber batts or attached.
Figure 5B:
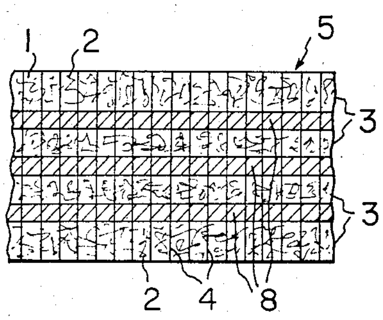
Figure 5C:
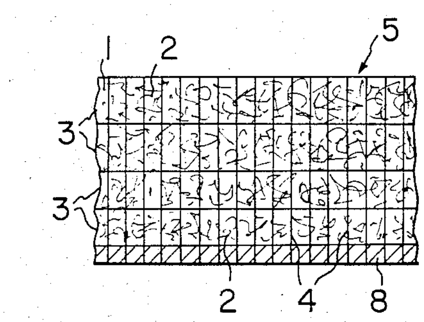
Figure 5D:
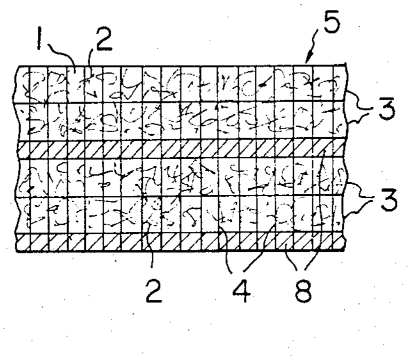
Figure 6A:
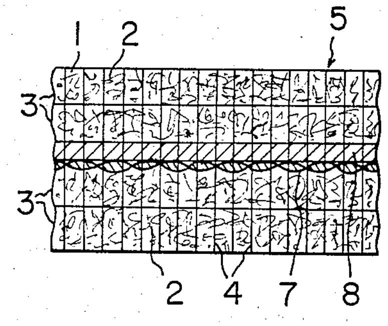
FIGS. 6A, 6B, 6C and 6D show various embodiments in cross section wherein a foundation fabric and aromatic polyamide fiber batt joined to each other in layers is interposed between the mixed fiber batts or attached.
Figure 6B:
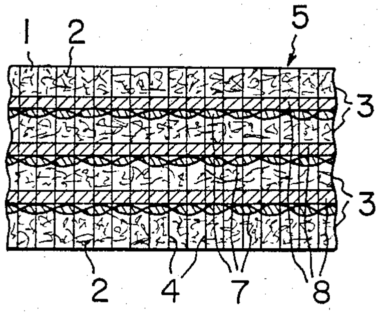
Figure 6C:
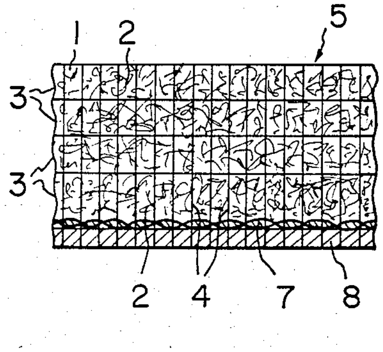
Figure 6D:
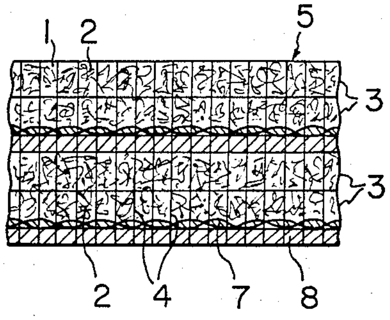

FIG. 3 shows one sample of a pad body 5 in which mixed fiber batts 3 are superimposed one on another in such a way that the mixing ratio of the aromatic polyamide fibers 2 to the carbon fibers 1 in each of the mixtures is increased stepwise upper surface layer to the lower layer. In this case, while the mixing ratio has to be within the specified range at least in the uppermost layer, the mixing ratio may be reversed that is, the amount of the aromatic polyamide fibers may be greater than that of the carbon fibers toward the lower layer. Such a gradation is effective for reducing the heat conductivity.

FIGS. 4A, 4B, 4C and 4D show various embodiments, in which at least one heat resistant foundation fabric 7 is interposed between the layers of the mixed fiber batts, or appended to the bottom surface of the lowermost layer of the mixed fiber batts 3. The material usable for the foundation fabric 7 may be carbon fibers, aromatic polyamide fibers, glass fibers, or admixtures thereof so long as the fibers are heat resistant, with the aromatic polyamide fibers being most preferred in view of the strength. Interposition or attachment of the foundation fabric 7 is effective for increasing the strength of the pad body 5.

FIGS. 5A, 5B, 5C and 5D show various embodiments, in which at least one batt 8 solely consisting of aromatic polyamide fibers (shown by oblique lines in the drawings) is interposed between the layers of the mixed fiber batts, or appended to the bottom surface of the lowermost layer of the mixed fiber batts 3. This is effective for reducing the heat conductivity of pad body 5 and reinforcing the mixed fiber batts in strength.

FIGS. 6A, 6B, 6C and 6D show various embodiments, in which at least one set of a heat resistant foundation fabric 7 and a batt 8 solely consisting of aromatic polyamide fibers, joined to each other, is interposed between the layers of the mixed fiber batts or appended to the bottom surface of the lowermost layer of the mixed fiber batts 3. In this case, both of the increase in the strength of the pad body 5 and the reduction in the heat conductivity are achieved.

Though in the embodiments of FIG. 3 to FIG. 6, silicone resin coating and impregnation is not illustrated, however, when a silicone resin heat resistant paint is coated and impregnated, an improved effect can be obtained in wear resistance and impact resistance to protect the pad body.

As described above, according to this invention, since the pad body is comprised essentially of carbon fibers, it can well withstand the high temperature of aluminium extruded products (550°–600° C.) which are freshly extruded from the die onto the initial table or the run-out table. Further, since aromatic polyamide of low heat conductivity is admixed with carbon fibers and they are needle-punched into a felt-like structure, the heat conductivity of the pad can be maintained low irrespective of the use of the carbon fibers. As the result, no differences in temperature, upon cooling, occur between the portions in contact and those not in contact with aluminium extruded products, as compared with conventional carbon plates, whereby improvement in the quality of the extruded products can be expected, as well as improved wear resistivity and prolonged service life in the pad.

Further, since the felt-like structure is obtained by needle punching the plural layers of the mixed fiber batts essentially consisting of carbon fibers admixed with aromatic polyamide fibers, the heat resistant pad of this invention possesses adequate flexibility and cushioning property, which prevent scratches to the extruded products and the grooved traces formed by the extruded products, in the conventional carbon plate. In addition, since the present pad has an adequate frictional coefficient, it can effectively transport the extruded products when used in a lift arm or a cooling table.

Furthermore, since the pad according to this invention comprises a fiber assembly, it is utterly free from problems such as cracking or chipping due to the impact and heat of the extruded products and can be used stably for a long time.

Moreover, silicone resin coating and impregnation is effective to strengthen the pad body in wear resistance and impact resistance while maintaining adequate flexibility, cushioning property, frictional coefficient as well as the initial form of the pad body, and, thereby, further elongated service life can be obtained.

What is claimed is:

1. A heat resistant pad comprising a plurality of batt layers, each batt layer consisting essentially of carbon fibers admixed with aromatic polyamide fibers, the ratio of said aromatic polyamide fibers to carbon fibers increasing incrementally, batt by batt, from the batt layer at one surface to the batt layer at the opposite surface and the ratio of carbon fibers to aromatic polyamide fibers in each of said batt layers being within the range of 8:2 to 6:4, said batt layers being superposed one on another and entangled into an integral felt-like structure by needle punching.

2. A heat resistant pad comprising a plurality of batt layers, each batt layer consisting essentially of carbon fibers admixed with aromatic polyamide fibers, the ratio of said aromatic polyamide fibers to carbon fibers increasing incrementally, batt by batt, from the batt layer at one surface to the batt layer at the opposite surface and the ratio of carbon fibers to aromatic polyamide fibers in each of said batt layers being within the range of 8:2 to 6:4, said batt layers being superposed one on another and entangled into an integral felt-like structure by needle punching in which at least one surface layer of the pad body is coated and impregnated with a heat-resistant silicone resin.

3. The heat resistant pad of claim 1 wherein at least one heat resistant foundation fabric is interposed between batt layers and/or affixed to one surface of said pad.

4. The heat resistant pad of claim 1 wherein at least one batt consisting essentially of aromatic polyamide fibers alone is interposed between two of said batt layers and/or affixed to one surface of said pad.

5. The heat resistant pad of claim 1 wherein at least one set of a heat resistant foundation fabric adjoined to a batt consisting essentially of aromatic polyamide fibers is interposed between said batt layers and/or affixed to a surface of said pad.

6. The heat resistant pad of claim 2 wherein at least one heat resistant foundation fabric is interposed between batt layers or affixed to one surface of said pad.

7. The heat resistant pad of claim 2 where at least one batt consisting essentially of aromatic polyamide fibers alone is interposed between two of said batt layers or affixed to one surface of said pad.

8. The heat resistant pad of claim 2 where at least one set of a heat resistant foundation fabric adjoined to a batt consisting essentially of aromatic polyamide fibers is interposed between said batt layers or affixed to a surface of said pad.

* * * * *